(12) United States Patent
Sutherland et al.

(10) Patent No.: US 6,480,149 B1
(45) Date of Patent: Nov. 12, 2002

(54) ELECTRICAL, MECHANICAL, AND LOGICAL INTERFACE FOR A USER TERMINAL GPS ACCESSORY MODULE

(75) Inventors: Mark Sutherland, San Diego, CA (US); Bruce Hammon, San Diego, CA (US); Amala Kelshiker, Murrieta, CA (US); Kristian Rauhala, San Diego, CA (US); Rolf Huber, San Diego, CA (US); Robert Twitchell, San Diego, CA (US); John Topoleanu, San Diego, CA (US); Sami Sabat, San Diego, CA (US)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/473,485

(22) Filed: Dec. 28, 1999

(51) Int. Cl.[7] .................................................. G01S 5/14
(52) U.S. Cl. .................................................. 342/357.1
(58) Field of Search ........................ 342/357.09, 357.1, 342/357.07

(56) References Cited

U.S. PATENT DOCUMENTS

| | | | | |
|---|---|---|---|---|
| 5,418,537 A | * | 5/1995 | Bird | 342/357.1 |
| 5,479,479 A | * | 12/1995 | Braitberg et al. | 379/58 |
| 5,712,899 A | | 1/1998 | Pace, III | 379/58 |
| 5,726,893 A | | 3/1998 | Schuchman et al. | 364/449.7 |
| 5,786,789 A | | 7/1998 | Janky | 342/357 |
| 5,847,679 A | * | 12/1998 | Yee et al. | 342/357.1 |
| 6,100,670 A | * | 8/2000 | Levesque | 320/150 |
| 6,121,922 A | * | 9/2000 | Mohan | 342/357.1 |
| 6,131,067 A | * | 10/2000 | Girerd et al. | 701/213 |
| 6,144,336 A | * | 11/2000 | Preston et al. | 342/357.09 |
| 6,321,091 B1 | * | 11/2001 | Holland | 455/456 |
| 2001/0014597 A1 | * | 8/2001 | Takiguichi et al. | 455/343 |

* cited by examiner

Primary Examiner—Gregory C. Issing
(74) Attorney, Agent, or Firm—Harrington & Smith, LLP

(57) ABSTRACT

An accessory module for a user terminal is disclosed that utilizes information broadcast from the GPS system to determine the user terminal's position on the earth. An improved electrical interface between the GPS accessory module and the user terminal is utilized that takes advantage of pre-existing electrical interfaces within the user terminal. The accessory module also includes a method and apparatus for managing its power consumption. A set of mechanical interfaces among the components of the GPS accessory module are disclosed for minimizing electrical path lengths, noise and crosstalk in the accessory module, and for providing for mechanical mounting of the components. A mechanical interface between the user terminal and the accessory module is also disclosed for coupling to an existing user terminal in place of that user terminal's removable battery pack. The invention further includes a method and apparatus for improving the accessory module's accuracy by providing position assistance data from a position reference server. The assistance data is provided to the accessory module by way of a transmission channel communication between the user terminal and the position reference server.

7 Claims, 7 Drawing Sheets

ELECTRICAL, MECHANICAL, AND LOGICAL INTERFACE FOR A USER TERMINAL GPS ACCESSORY MODULE

FIELD OF THE INVENTION

This invention relates generally to radiotelephones or user terminals and, in particular, to an accessory module for providing location information for use by a radiotelephone or user terminal.

BACKGROUND OF THE INVENTION

The use of position information that is widely broadcast, for example, the Global Positioning System (GPS), for obtaining location data, i.e., a terrestrial position fix including latitude, longitude, and possibly elevation, is widespread and well known. Time may also be calculated from GPS data. It has been proposed that user terminals or wireless stations in modern wireless telecommunications systems include a capability to receive GPS information and to thereby calculate their position on the surface of the Earth.

It is known to include GPS functions in a battery power module for a cellular telephone. Reference in this regard can be had, by example, to U.S. Pat. No. 5,786,789, issued Jul. 28, 1998, entitled "GPS and Cellphone Unit Having Add-On Modules", by J. Janky. In Janky, the electrical interface between the add-on module and the cell phone is implemented by UARTS communicating over two, unidirectional, serial lines. The electrical interface also utilizes the cell phone transmitter and receiver for transmitting GPS data from the add-on module to the cell phone. This electrical interface is not optimum for user terminals that are not adapted to receive information in these ways. A user terminal that does not have the requisite UARTS or serial lines available, or that does not have the capability to recognize information conveyed between UARTS, will not be capable of such communication. Also, user terminals that are not adapted to receive GPS data through their transmitter and receiver may not be able to operate with the GPS module disclosed in Jansky.

An accessory module that uses the same battery as the user terminal will consume power, and will thus negatively impact the talk and standby time of the user terminal. It is important that such an accessory module consume as little power as possible while performing its intended function(s), as well as when it is not performing its intended function(s).

The GPS system transmits two microwave carrier signals, a 1575.42 MHz carrier and a 1227.60 MHz carrier. These signals as received are attenuated (approximately −130 db). The mechanical placement of the accessory module components in relationship to each other is thus important in order to minimize signal length and to receive and amplify these signals, without introducing noise or crosstalk. The mechanical placement of the accessory module components is also important in that the accessory module should easily attach to the user terminal, and should also attach without interfering with the use of the terminal or with other accessories that may be attached.

For user terminals equipped with a GPS accessory module, a problem arises when the user terminal is out of view of the GPS satellite constellation. A server may be provided on the wireless network to receive position data from the user terminal, and based on additional information available, provide additional data to the user terminal for position determination. Reference in this regard can be had, by example, to allowed commonly assigned U.S. patent application Ser. No.: 09/547,089, filed Apr. 12, 2000, entitled "GPS Assistance Data Delivery Method and System", by K. Pihl and H. Pirila. The disclosure of this patent application is incorporated by reference herein in its entirety insofar as it does not conflict with the teachings of the present invention.

OBJECTS AND ADVANTAGES OF THE INVENTION

It is an object and advantage of this invention to provide an improved accessory module for a user terminal that utilizes information broadcast from the GPS system to determine the user terminal's position on the earth.

It is a further object and advantage of this invention to provide an improved electrical interface between the GPS accessory module and the user terminal.

It is a further object and advantage of this invention to provide a power management capability in the accessory module to reduce power consumption.

It is a further object and advantage of this invention to provide a mechanical interface between the components of the GPS accessory module, and also between the GPS accessory module and the user terminal.

It is another object and advantage of this invention to improve the accuracy of a GPS determined location by supplying additional data to a GPS accessory module from a position reference server on the wireless network that is accessible by the accessory module through the user terminal.

SUMMARY OF THE INVENTION

The foregoing and other problems are overcome and the objects of the invention are realized by methods and apparatus in accordance with embodiments of this invention.

A GPS accessory module for a user terminal is disclosed which includes an antenna for receiving GPS signals, circuitry for calculating location data from the GPS signals, and a communication unit. The communication unit is bi-directionally coupled to the calculating circuitry and manages communication between the circuitry and the user terminal. The communication unit includes an in-band modem for converting the calculated location data to a signal having a range of frequencies suitable for digitizing by a voice coder of the user terminal.

An energy management unit for the GPS accessory module is disclosed for controlling the power consumption of the module circuitry in response to information received from the user terminal.

A position reference unit in communication with said accessory is disclosed. The position reference unit includes circuitry for exchanging data with the communication unit and a position assistance task for providing assistance data to the said communication server. The position assistance data is used by the calculation circuitry for improving the calculation of the location data. The communication unit is further disclosed as including circuitry for initiating communication between the communication unit and the position reference unit through a wireless transmission channel.

The in-band modem of the communications unit is further disclosed as including circuitry for conveying a signal to the voice coder of the user terminal by an audio input signal and for receiving and demodulating another signal from an audio output of a voice decoder of the user terminal.

The GPS accessory module is further disclosed as including a connector coupled to a battery. The connector includes a power bus to convey power to both the accessory module and the user terminal, a signal for identifying the accessory module to the user terminal, and a signal which operates in two modes: as an input to the accessory module to cause a power up condition; and as an output to indicate battery temperature.

The GPS accessory is also disclosed as including a system connector which includes at least one digital data bus to convey control signals between the terminal and the accessory, and an analog signal bus to convey location data to the user terminal from the calculation circuitry. Both the battery connector and the system connector take advantage of pre-existing electrical interfaces within the user terminal.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
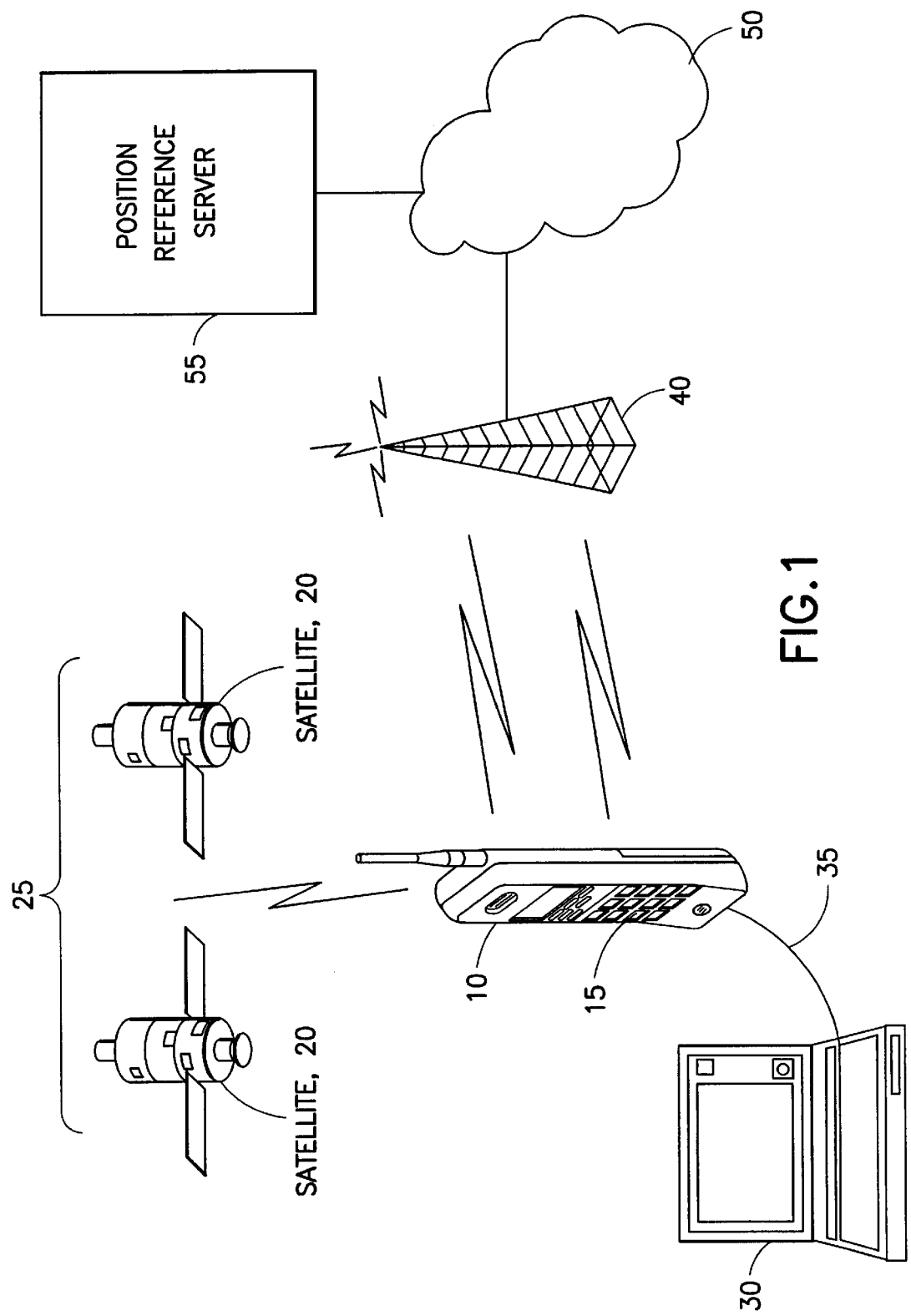
FIG. 1 is a block diagram of a wireless communications system utilizing the functions and embodiments disclosed herein.

FIG. 1 shows a system in accordance with the teachings of this invention. A user terminal 10 equipped with a GPS accessory module 15 receives position information from at least one satellite 20 which may be part of a GPS satellite constellation 25. The user terminal communicates with a computing device 30 through a link 35. The user terminal 10 further communicates with at least one base station 40. The base station 40 provides the user terminal 10 with communication access to other user terminals 45, and provides communication with at least one network 50. The network 50 may include wireless networks, wired networks, and any other network available for providing communication with the user terminal 10, including the PSTN. Through the network 50 the base station further provides the user terminal 10 with access to a position reference server 55. The position reference server 55 receives position information from the user terminal 10 and utilizes that information to return further position data, referred to as position assistance data, to the user terminal 10.

The satellites 20 and the satellite constellation are preferably part of what is generally known as the Global Positioning System or GPS.

Figure 2:
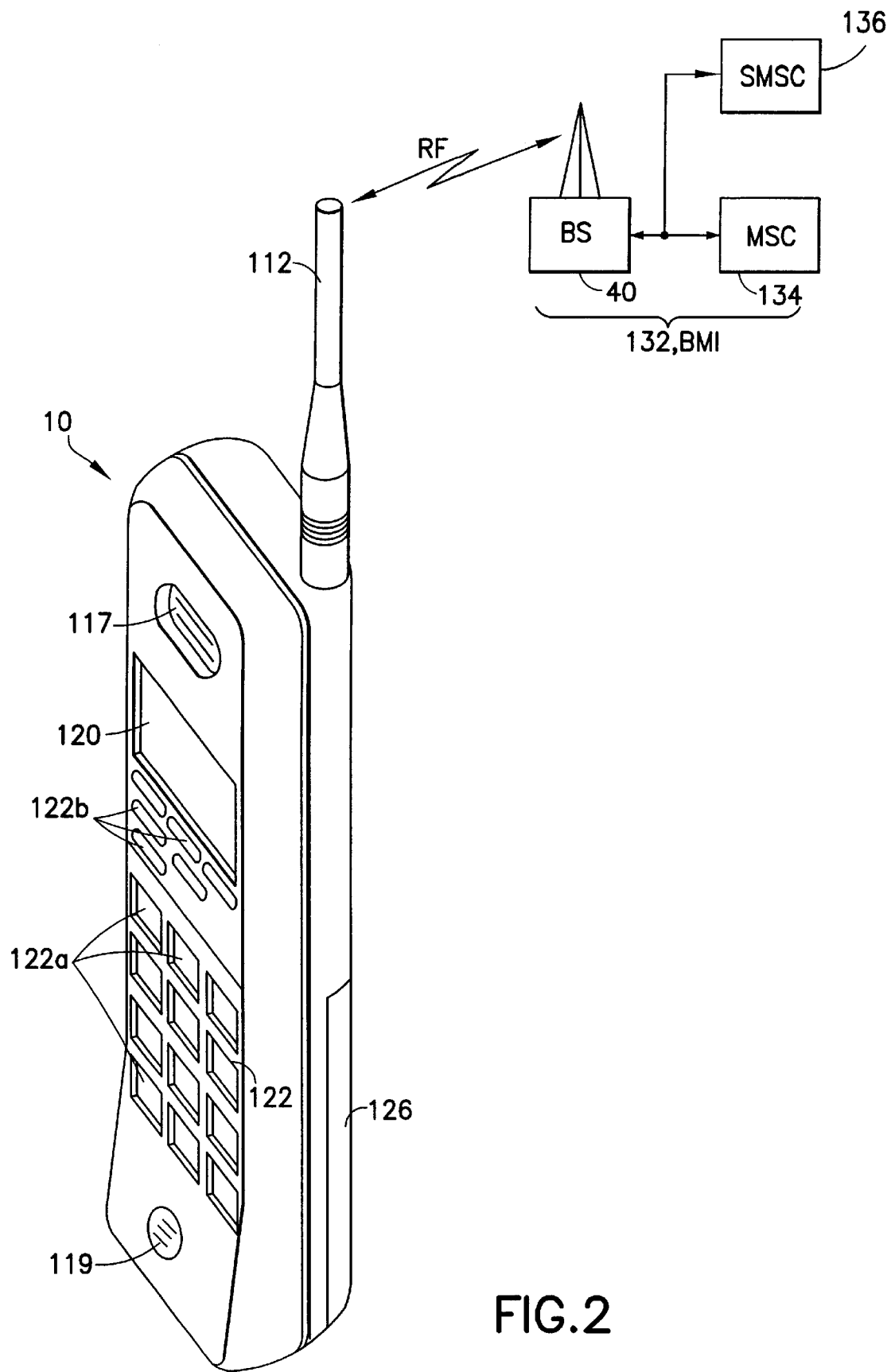
FIG. 2 is an elevational view of a user terminal and further illustrates a wireless communication system and a service provider to which the user terminal is bi-directionally coupled through wireless RF links.
Figure 3:
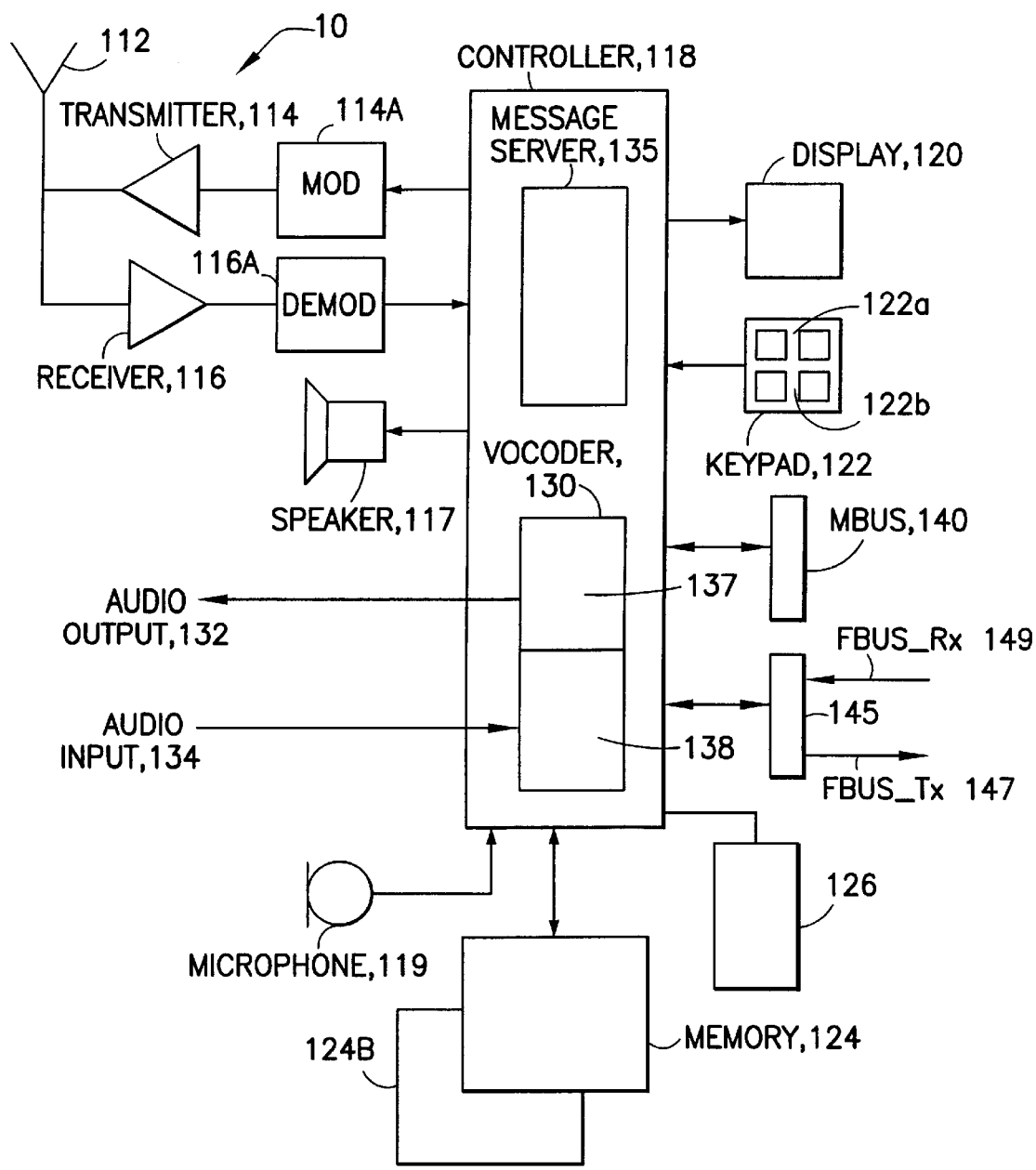
FIG. 3 is a block diagram of a user terminal that is suitable for practicing this invention.

Reference is made to FIGS. 2 and 3 for illustrating the user terminal 10 that is suitable for practicing this invention.

The user terminal 10 may be, but is not limited to, a cellular telephone or a personal communicator. It should be understood that the user terminal 10 can be a vehicle mounted or a handheld device.

The user terminal 10 includes an antenna 112 for transmitting signals to and for receiving signals from the base station 40. The base station 40 can be a part of a cellular network comprising a Base Station/Mobile Switching Center/Interworking function (BMI) 132 that includes a mobile switching center (MSC) 134. The MSC 134 provides a connection to landline trunks when the user terminal 10 is involved in a call. Other wireless network facilities such as a Short Message Service Center (SMSC) 136 could also be provided.

The user terminal 10 includes a modulator (MOD) 114A, a transmitter 114, a receiver 116, a demodulator (DEMOD) 116A, and a controller 118 that provides signals to and receives signals from the transmitter 114 and receiver 116, respectively. These signals include signaling information in accordance with the air interface standard of the applicable cellular system, and also user speech and/or user generated data. The particular type of air interface standard is not important to the operation of this invention, as the teachings of this invention apply generally to communications systems, including digital time division/multiple access (TDMA) systems (e.g., GSM, PDC) and code division/ multiple access (CDMA) systems, as well as FDM systems such as frequency modulated (FM) systems (e.g., AMPS).

The controller 118 may include, or implement, a vocoder 130 for speech coding and decoding. It is understood that the controller 118 also includes other circuitry required for implementing the audio (speech path) and logic functions of the user terminal. By example, the controller 118 may be comprised of a digital signal processor device, a microprocessor device, and various analog to digital converters, digital to analog converters, and other support circuits. The control and signal processing functions of the user terminal are allocated between these devices according to their respective capabilities.

Access to the controller 118 and its functions maybe had through two bi-directional ports 140, 145. Port 140 is hereinafter referred to as the MBUS. The MBUS 140 is a half-duplex, bi-directional, serial bus that provides communication among the functions of the controller 118. The MBUS also provides communications between the functions of the user terminal 10 and accessories that may be a part of the user terminal 10. The MBUS 140 is a multi-point or multi-drop bus, i.e., many functions can be connected to the MBUS 140 simultaneously. The MBUS is a USART (Universal Synchronous/Asynchronous Receiver Transmitter) type bus and thus provides both synchronous and asynchronous communications. A message server 135 in the controller 118 routes communications over the MBUS to their destinations.

Port 145 is hereinafter referred to as the FBUS and, in this embodiment, provides communication between the user terminal 10 and the external computing device 30. The FBUS 145 is a full duplex, UART (Universal Asynchronous Receiver Transmitter) type bus. The FBUS comprises two signal lines, FBUS_Tx, 147 and FBUS_Rx 149.

A user interface includes a conventional earphone or speaker 117 and an audio output 132 for driving an external speaker, or for providing audio output to accessories. The user interface further includes a conventional microphone 119 and an audio input 134 for receiving audio from an external microphone, or from accessories. In the case where the controller 118 includes the vocoder 130, the audio output 132 is preferably an output of the voice decoder 137 of the vocoder 130, and the audio input 134 is preferably an input to the voice coder 138 of the vocoder 130.

The user interface also includes a display 120, and a user input device, typically a keypad 122, all of which are coupled to the controller 118. The keypad 122 includes the conventional numeric (0–9) and related keys (#,*) 122a, and other keys 122a used for operating the user terminal 10. These other keys 122b may include, by example, a SEND key, various menu scrolling and soft keys, and a PWR key.

The user terminal 10 also includes a battery enclosure 126, which is preferably removable, for powering the various circuits that are required to operate the user terminal. The battery enclosure 126 preferably contains the GPS accessory module 15.

The user terminal 10 also includes various memories, shown collectively as the memory 124, wherein are stored a plurality of constants and variables that are used by the controller 118 during the operation of the user terminal. For example, the memory 124 stores the values of wireless system parameters and the number assignment module (NAM). An operating program for controlling the operation of controller 118 is also stored in the memory 124 (typically in a ROM device). The operating program in the memory 124 includes routines to present messages and message-related functions to the user on the display 120, typically as various menu items. The memory 124 may also include a memory 124B (FIG. 3), which could be a portion of memory 124, for containing a program that includes routines for implementing the method disclosed herein. The program can provide menus to the user, and based on the user's menu selections, operates to provide user terminal position or location information.

One of the objects of this invention is to provide an improved electrical interface between the GPS accessory module and the user terminal 10. In the presently preferred embodiment this is attained by providing communication between the GPS accessory module 15 and the user terminal 10 over the bi-directional MBUS 140. As stated above, the GPS accessory module 15 receives position information from the satellite 20. The user terminal 10 may utilize this information locally, or it may transmit it to the optionally connected computing device 30 by way of the FBUS 145. The user terminal 10 may also transmit the position information externally to the position reference server 55 by way of a wireless communication. The user terminal 10 may further operate to receive position assistance data from the position reference server 55 and provide that data to the GPS accessory module 15. The user terminal 10 may further operate to issue energy management commands to the GPS accessory module 15 in order to conserve power and extend operating time.

Figure 4:
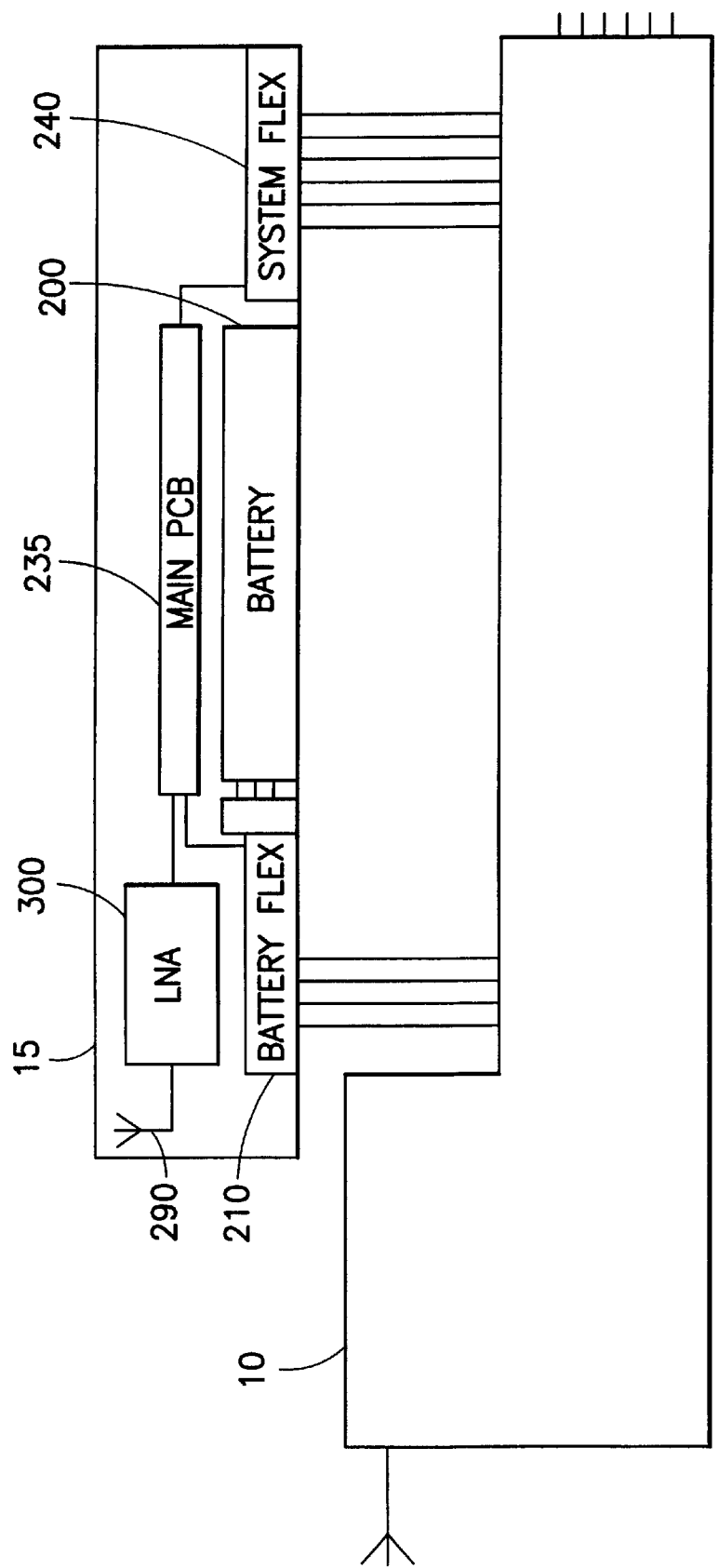
FIG. 4 shows a block diagram of a GPS accessory module and its electrical connections to a user terminal

FIG. 4 shows a block diagram of the GPS accessory module and its electrical connections to the user terminal 10. GPS information from the satellites 20 (FIG. 1) is received by antenna 290 and conveyed to low noise amplifier circuit 300. The output of low noise amplifier circuit 300 is coupled to a main printed circuit board 235 which contains the circuitry for implementing the position determining functions and logic functions of the GPS accessory module 15. A flexible circuit board, referred to as a battery flex 210, is used to transfer power from a battery 200 to the circuitry in the GPS accessory module 15, as well as to the user terminal 10. An additional flexible circuit board, referred to as a system flex 240, conducts control signals and information between the user terminal 10 and the main printed circuit board 235.

Figure 5:
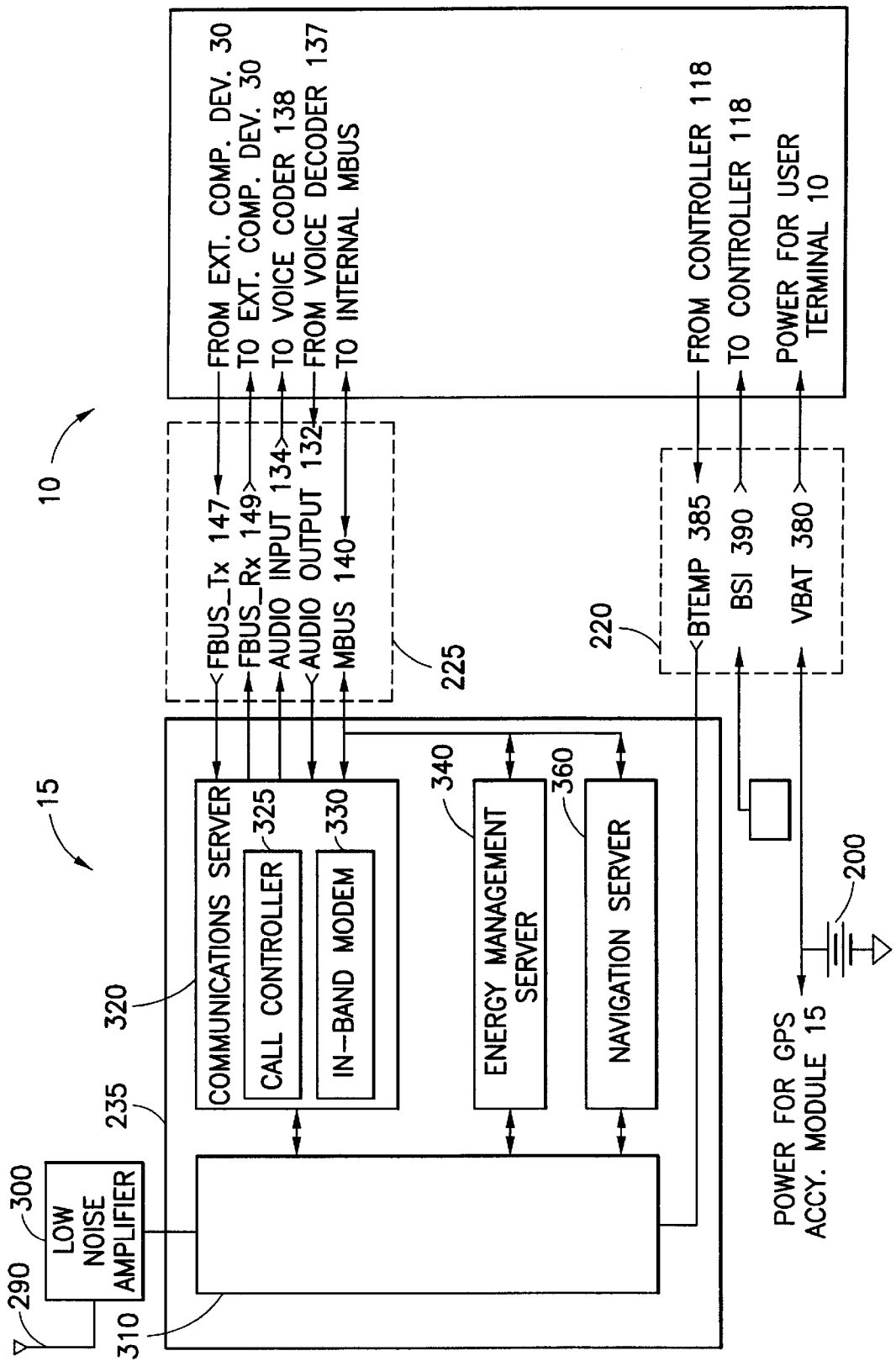
FIG. 5 is a block diagram of the preferred embodiment of the GPS accessory module.

FIG. 5 shows a block diagram of the GPS accessory module 15 and the signals conducted by the system flex 240 and the battery flex 210 in greater detail. As was stated above, GPS information from the satellite 20 (FIG. 1) is received by antenna 290 and conveyed to low noise amplifier circuit 300. The output of low noise amplifier circuit 300 is coupled to the main printed circuit board 235 which includes position calculation circuitry 310 and several servers 320, 340, 360. The position calculation circuitry 310 calculates location information based on the GPS information received from the satellite 20 and/or received from the position reference server 55. It is important to note that the position calculation circuitry 310 also includes circuitry required for implementing the position determining functions and logic functions of the GPS accessory module 15. By example, the position calculation circuitry 310 may be comprised of a digital signal processor device, a microprocessor device, and various analog to digital converters, digital to analog converters, and other support circuits. By further example, the calculation circuitry 310 may also be comprised of a memory which may contain programs for performing some of the functions of the GPS accessory module 15. The control, communication, and signal processing functions of the GPS accessory module 15 are allocated among these devices according to their respective capabilities.

The calculation circuitry 310 communicates with a data communications server 320, an energy management server 340, and a navigation server 360. The data communications, energy management, and navigation servers 320, 340, 360 exchange information over the MBUS 140 with appropriate functions within the user terminal 10.

In general, the data communication server 320 opens and closes communications paths among the navigation server 360, the user terminal 10, the position reference server 55 (FIG. 1), and/or the computing device 30 (FIG. 1). These communication paths are used to convey position information from the navigation server 360, or position assistance data from the position reference server 55. The communication server communicates with the user terminal 10 over the MBUS 140. For communicating with the external computing device 30, the data communication server 320 communicates using FBUS_Tx 147 and FBUS_Rx 149 signal paths.

The data communication server 320 includes a call controller 325 which issues commands to the user terminal 10 to open and close communication over a wireless transmission channel for communicating with the position reference server 55. In a presently preferred embodiment, after the data communication server 320 has opened a transmission channel it utilizes an in-band modem 330 which sends and receives tones that are suitable for passing through the user terminal vocoder 130. Due to typical user terminal vocoder bandwidth limitations, bit rates of approximately 150–4800 bit/s may be achieved. However, because of the relatively small amount of data to be exchanged, this relatively low bit rate is not a serious limitation to data transfer. The in-band modem 330 is suitable for data transfers over, for example, CDMA and AMPS transmission channels.

In accordance with an aspect of this invention, the in-band modem 330 exchanges signals with the vocoder 130 through the audio input 132 and audio output 134 of user terminal controller 118. It can be appreciated that through the use of the in-band modem 330, a traffic channel (voice channel) can be used to convey the data transfer. However, in other embodiments, the call controller may use other channels for communications, for example, control or packet data channels.

The navigation server 360 controls the location calculations of the control circuitry 310 and conveys position information to the communication server 320. Alternatively, the navigation server 360 may receive position assistance data from the position reference server 55, and cause the control circuitry 310 to include that data when performing location calculations. The position assistance data provided to the navigation server 360 may include, without limitation, the approximate position of the user terminal 10, the exact time, satellite ephemeris data, almanac data, and differential corrections for subsequent position calculations.

The energy management server 340 monitors and controls the power consumption of the GPS accessory module 15. On power up, the energy management server 340 sends a predefined hardware power consumption table to the user terminal 10 over the MBUS 140. The table includes entries for various portions of the control circuitry 310. During operation of the GPS accessory module 15, the user terminal 10 may send a power state change request to the energy management server 340. Upon receipt, and if the GPS accessory module 15 is in the requested state, the energy management server 340 will do nothing. Otherwise, the energy management server 340 coordinates a change in power consumption of the various portions of the control circuitry 310 in order to achieve the requested power state. Once the power change is successful, the energy management server 340 updates the hardware power consumption table and sends it to the user terminal 10. If the power change was unsuccessful, the energy management server 340 sends a message to that effect to the user terminal 10.

Signal paths FBUS_Tx 147, FBUS_Rx 149, audio input 134, audio input 132, and MBUS 140 are coupled from the GPS accessory 15 through the user terminal 10 by a system connector 225. This system connector 225 may be a standard connector that can be used for other functions as well, and is thus not specially designed or adapted for use with only the GPS accessory module 15. It should be understood that system connector 225 is not limited to coupling only the aforementioned signal paths but may include any signal paths that may be coupled between the GPS accessory module 15 and the user terminal 10.

Battery interface signals are coupled from the GPS accessory 15 to the user terminal 10 through battery connector 220. The battery interface signals include VBAT 380, BTEMP 385, and BSI 390, which will now be explained. A battery 200 provides operating power to the GPS accessory module 15. The battery 200 also provides power to the user terminal 10 through the conductor VBAT 380. BTEMP 385 is a signal that serves two functions. The controller 118 may force BTEMP to a voltage level which causes the GPS accessory module 15 to power up and begin operating. BTEMP also serves as an output from the GPS accessory 15 to the user terminal 10 indicating the temperature of the battery 200. BSI 390 is used by the controller 118 to identify the accessory. In a preferred embodiment, the controller interrogates the BSI 390 function to identify a battery size. Upon identification of a particular battery size assigned to the GPS accessory module, the controller 118 then concludes that the GPS accessory module 15 is coupled to the user terminal 10. It should be understood that battery connector 220 is not limited to coupling only the aforementioned battery interface signal paths but may include any signal paths that may be coupled between the GPS accessory module 15 and the user terminal 10. As stated for the system connector 25, the battery connector 220 may also be a standard connector that can be used for other functions as well, and is thus not specially designed or adapted for use with only the GPS accessory module 15.

Figure 6:
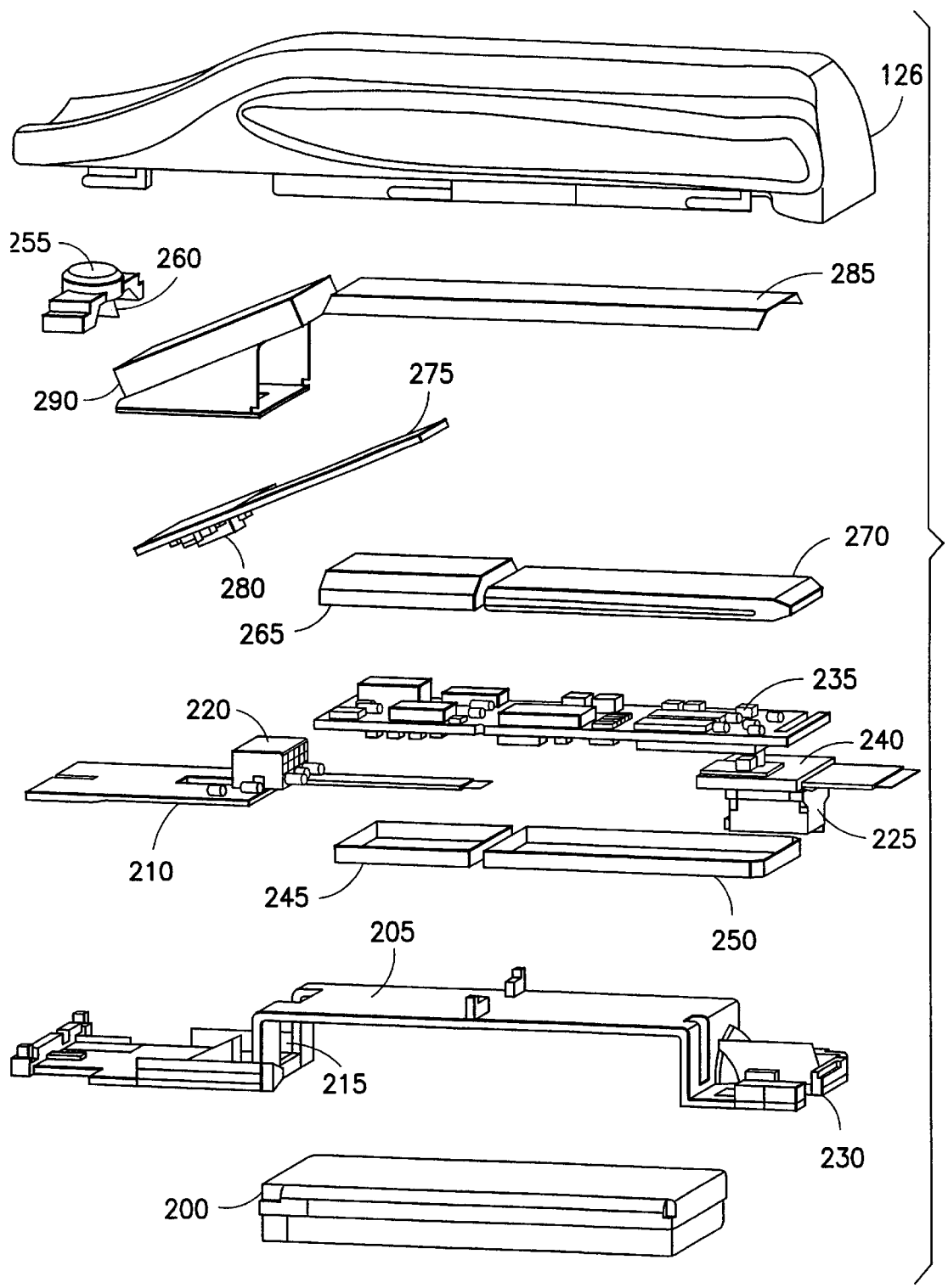
FIG. 6 is an exploded view of a preferred embodiment of a GPS accessory module in accordance with the teachings of this invention.

The mechanical components and assembly of the GPS accessory module will now be described. FIG. 6 shows an exploded view of the GPS accessory module 15 as embodied in the battery enclosure 126.

The battery 200, also shown in FIG. 5, is provided for supplying power to the GPS accessory module 15 and to the user terminal 10. The battery 200 may be user replaceable.

A bracket assembly 205 retains the battery 200 and provides a mounting platform for modules of the GPS accessory module 15. A battery flex 210 mounts to the bracket assembly 205 and an opening 215 allows the battery connector 220, also shown in FIG. 5, to contact the battery 200. The battery flex 210 is used to transfer power from the battery 200 to the GPS accessory module 15 and to the user terminal 10 simultaneously. The battery flex is preferably soldered to a main printed circuit board 235 and then reinforced using an epoxy bond for strain relief. The system connector 225 also shown in FIG. 5, mounts to the bracket assembly 205 and an opening 230 allows the system connector 225 to contact the user terminal 10. A system flex wiring board conducts signals between the user terminal 10 and the main printed circuit board 235 through the system connector 225.

A bottom shield assembly is partitioned into two parts. A bottom RF shield portion 245 shields the RF portion of the bottom side of the main printed circuit board 235. A bottom baseband shield portion 250 shields the baseband portion of the bottom side of the main printed circuit board 235. Alternatively, two separate shield assemblies could be used.

The main printed circuit board 235 is preferably a double sided, 6 layer, printed circuit board. The main printed circuit board 235 is located and supported by two tabs on the bracket assembly 205 which slide into slots on the main printed circuit board 235.

A battery latch 255 is used to retain the GPS accessory module 15 to the user terminal 10. A latch spring 260 is assembled under the latch to provide a return force to hold the battery latch 255 in place.

A top shield assembly is partitioned into two parts. A top RF shield assembly portion 265 includes a frame and a removable lid for troubleshooting and is located in close proximity to the RF section of the top side of the main printed circuit board 235. A top baseband shield portion 270 is located in close proximity to the baseband section of the top side of the main printed circuit board 235. Alternatively, two separate shield assemblies could be used.

A low noise amplifier flex wiring board, also referred to as an LNA flex 275, is located adjacent to the top RF shield portion 265 and the top baseband shield portion 270. The LNA flex 275 is preferably soldered to the main PCB and then reinforced using an epoxy bond for strain relief. The LNA flex 275 includes a low noise amplifier shield, also referred to as an LNA shield 280. The LNA shield 280 may, in the same manner as the other shields, be constructed as one piece. All of the various shields could be constructed using an electrically conductive nickel-silver material.

A ground plane flex 285 is provided for the purpose of increasing the size of a ground plane on which a GPS antenna 290 is mounted. The ground plane flex 285 may be constructed as a single layer of metal or metalization, and may further be constructed in such a way as to increase the circular polarization of the GPS antenna 290. The GPS antenna 290 can be a patch antenna which has been designed in shape to fit within the GPS accessory module 15 and designed in frequency for receiving the GPS signals. The GPS antenna 290 has further been designed to resonate at an appropriate frequency for receiving GPS signals when assembled with the components of the GPS module 15. The GPS antenna 290 is preferably constructed of a metal, such as aluminum, that is deposited onto a dielectric substrate, such as a ceramic substrate.

The battery enclosure 126 is provided to enclose the GPS accessory module 15. The enclosure 126 may be ultrasonically welded to the bracket assembly 205 to form the enclosure for the GPS accessory module 15. The battery enclosure 126 is shaped to be form and fit compatible with a user terminal battery pack and as such defines a shape that does not interfere with existing accessories for the user terminal 10.

Figure 7:
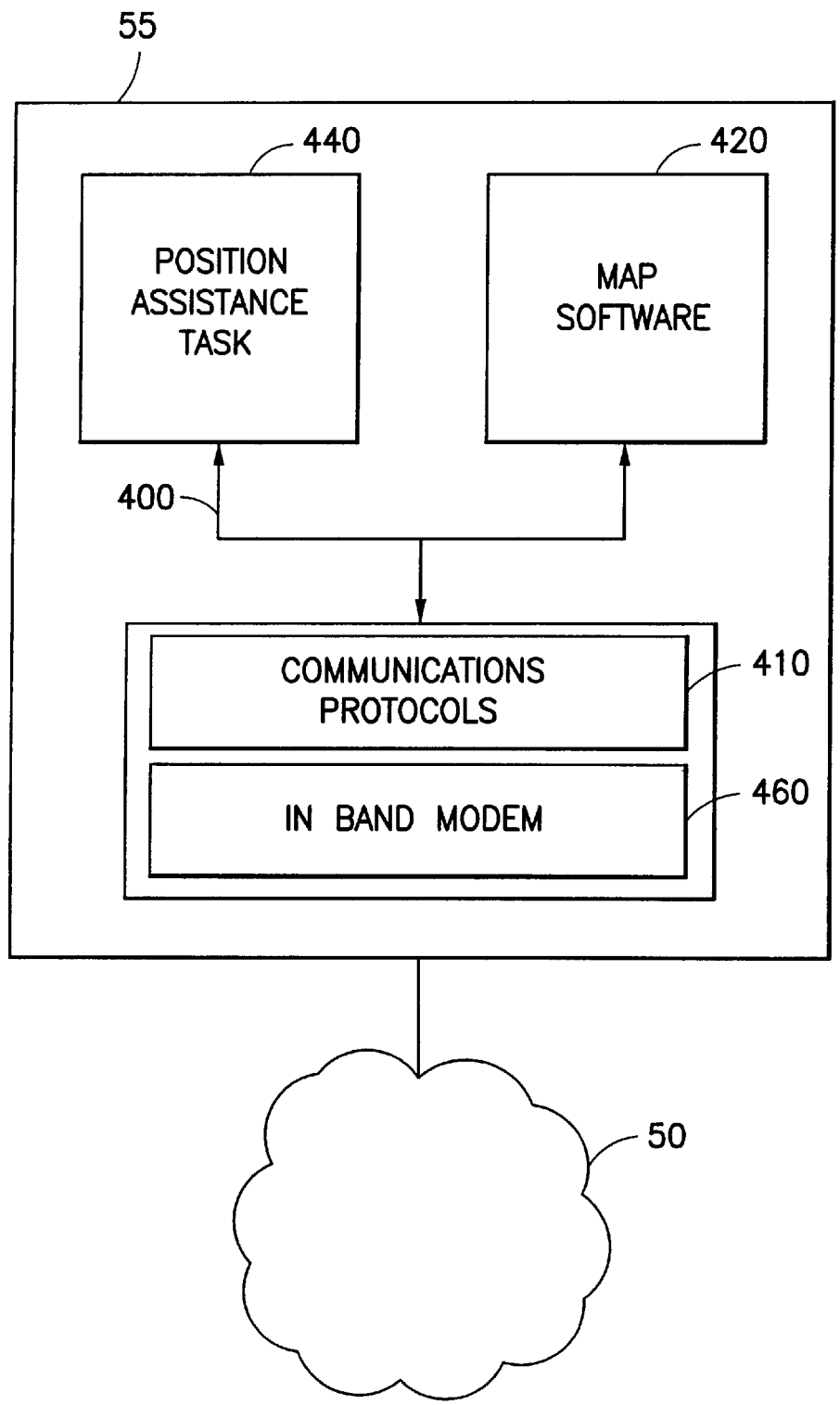
FIG. 7 is a block diagram of a position reference server that is part of a wireless communication system to which a user terminal is bidirectionally coupled.

Turning to FIG. 7, the functions of the position reference server 55 are now described. The purpose of the position reference server 55 is to receive calculated location information from the GPS accessory module 15 (FIG. 5) and to provide position assistance data to the GPS accessory module 15. The position reference server 55 includes at least one application program 400, communication protocols 410, map software 420, a position assistance task 440, and a modem 460. Communications from the GPS accessory module through the user terminal 10 are received by the modem 460. The communication protocols 400 control the reception of incoming calls. The data rate for the information transferred during the call is decided by the user terminal 10. The application program 400 routes the data to the correct task within the position reference server 55. The map software 420 receives calculated location information from the GPS accessory module 15 and displays the location information on a graphical map. The position assistance task 440 also receives the calculated location information from the GPS accessory module and calculates position assistance data to be used by the GPS accessory module 15 to improve the accuracy of the calculated location information in the event that the GPS accessory module 15 is unable to receive accurate position information from the satellite 20 (FIG. 1). The position assistance task 440 may use additional information to provide the assistance data including, without limitation, the number of satellites, satellite identification, satellite ephemeris data, the reference time, the location of the serving base station 40, and other calculations about the location, direction, and speed of the user terminal. Once the assistance data has been determined it is sent back to the GPS accessory module using the modem 460. As was stated above, the position assistance data provided to the GPS accessory module 15 may include, without limitation, approximate position of the user terminal 10, exact time, the satellite ephemeris data, and differential corrections for subsequent position calculations.

Returning to FIG. 1, the computing device 30 receives the calculated location information from the GPS accessory module 15 through link 35. Computing device 30 preferably includes a mapping program which utilizes the location information to display the current location graphically. The computing device may also be capable of providing other information to the user, including directions to other locations, distances between different locations, etc.

The computing device 30 may be a laptop computer, a personal organizer, or any type of computing device appropriate for use with user terminal 10 or the GPS accessory module 15.

In a further embodiment, the GPS accessory module 15 may also be coupled with a vehicle installed user terminal 10, and could aid in providing a navigation system for the vehicle. In such an embodiment, the FBUS 145 could be connected to a data processor on-board the vehicle.

In a further embodiment, the GPS accessory module 15 may be incorporated into a PCMCIA card, plugged into the computer device 30, and may communicate with the position reference server 55 through a wireless modem present in the computing device 30 or in the PCMCIA card. In this case, there may be no requirement for the user terminal 10.

It should be understood that while the presently preferred embodiment of the GPS accessory module 15 has been described as comprising having three servers, the communication server 320, the energy management server 340, and the navigation server 360, the invention is not limited to any particular number of servers, or to the use of discrete servers at all.

It should also be understood that this invention is not limited to receiving position information from the GPS system. In another embodiment, the user terminal may receive position information from any system, terrestrial or non terrestrial, that transmits position information that the GPS accessory module 15 is capable of receiving.

It should also be understood that the connection between the user terminal 10 and the external computing device 30 is not limited to the FBUS 145, but may include any bidirectional digital interface suitable for conveying the appropriate signals between the user terminal 10 and the external computing device 30.

It should be further understood that the antenna 290 is not limited to a patch antenna but may include an omnidirectional, linear, or helical configuration.

Thus, while the invention has been particularly shown and described with respect to preferred embodiments thereof, it will be understood by those skilled in the art that changes in form and details may be made therein without departing from the scope and spirit of the invention.

What is claimed is:

1. A position determining accessory module for use with a user terminal, comprising:

an antenna for receiving broadcast position information;

position calculation circuitry coupled to said antenna for computing location data from said position information;

a battery;

a first connector coupled to said battery, said connector comprising a power bus for conveying power from said battery to said accessory module circuitry and to said user terminal, a first signal for identifying said position determining accessory module to said user terminal, and a second signal operating to cause a power up condition in said accessory control module, and further operating to indicate a temperature of said battery to said user terminal; and a second connector comprising a first digital data bus for conveying at least control signals between said user terminal and said position determining accessory module, said second connector further comprising an analog signal bus for conveying location data to said user terminal from said position calculation circuitry.

2. The position determining accessory module of claim 1, wherein said analog signal bus is coupled to an in-band modem of said position determining accessory module.

3. The position determining accessory module of claim 1, wherein said analog signal bus provides position assistance data from an external server.

4. The position determining accessory module of claim 1, wherein said second connector comprises a second digital data bus for conveying location data to an external computing device.

5. The position determining accessory module of claim 1, wherein said antenna is a patch antenna.

6. The accessory module of claim 1, further comprising an enclosure enclosing said battery, said first connector, said second connector, said position calculation circuitry, and said antenna, said enclosure being form and fit compatible with a user terminal battery pack.

7. A Global Positioning System (GPS) accessory for coupling to a radiotelephone, said (GPS) accessory being housed in a detachable battery compartment of said radiotelephone, said GPS accessory comprising a data processor for executing position calculations based on received GPS signals, said data processor being coupled to a battery-related output signal from said battery compartment for being placed in a predetermined state by a radiotelephone circuit that drives the battery-related output signal, wherein said battery-related output signal is comprised of a battery temperature signal.

\* \* \* \* \*